United States Patent Office 3,506,623
Patented Apr. 14, 1970

3,506,623
PROCESS FOR PRODUCING HIGH MOLECULAR WEIGHT (CYCLO) ALIPHATIC POLYESTERS OF CARBONIC ACID WITH (CYCLO) GLYCOLS
Wolfgang Seeliger, Marl, Germany, assignor to Chemische Werke Huels A.G., Marl, Germany
No Drawing. Continuation-in-part of application Ser. No. 385,495, July 27, 1964. This application Oct. 30, 1967, Ser. No. 679,182
The portion of the term of the patent subsequent to Dec. 19, 1984, has been disclaimed
Int. Cl. C08g 17/13
U.S. Cl. 260—77.5
6 Claims

ABSTRACT OF THE DISCLOSURE

The process of producing high molecular weight polyesters of carbonic acid by reacting a primary alcohol with 1.0–1.3 mols of a chloroformic acid of an aliphatic univalent alcohol at 70–300° C. to produce an initial reaction product containing 1.0 to 2.0 alkyl carbonate groups per free hydroxyl group, and then effecting polycondensation at 100–300° C.

---

This application is a continuation-in-part of application Ser. No. 385,495, filed July 27, 1964, now U.S. Patent No. 3,359,242, granted Dec. 19, 1967.

The present invention relates to the production of high molecular weight polyesters of carbonic acid with aliphatic diols. More particularly, it relates to the production of high molecular weight polyesters of carbonic acid with aliphatic diols by reacting polyalkylene primary glycols with chloroformic acid esters of monohydric alcohols.

Thermoplastic polycarbonates have previously been produced by reacting aliphatic glycols with phosgene. Such reaction products were low molecular weight polycarbonates having low melting points.

Glycols have also been esterified with dialkyl- or diarylcarbonates using basic catalysts which were neutralized either during or after the reaction.

Dialkylcarbonates have also been produced from alkylene-bis(alkylcarbonates). None of the above products, however, have been of technical importance.

Thermoplastic polycarbonates have also been produced from glycols by reaction of bis-chlorocarbonates in the presence of tertiary amines. This process, however, has been of litle commercial use because of the high costs of the materials produced in this manner, and hence has been suitable for only preparing special types of polycarbonates.

Finally, in British Patent 925,139 there is a disclosure on page 4, lines 35–90, that 2,2,4,4-tetramethyl cyclobutane diol (a disecondary alcohol) and ethyl chloroformate can react in a mol proportion of about 1:2.4 respectively in the presence of pyridine (mol ratio of pyridine to diol being about 5:1, respectively) to produce a di(ethyl carbonate ester) of the diol which can then be converted into a polycarbonate. However, if this process is repeated without pyridine, it is ineffective. Consequently, this process also is undesirable because of the extra cost of pyridine as a starting material, and the contamination problem it presents which inherently leads to lower yields and higher costs, as compared to a process without pyridine—all other things being equal.

It is, therefore, a principal object of this invention to provide an improved process for the production of polycarbonates, and also the resultant products and intermediates produced therein.

Upon further study of the specification and claims other objects and advantages of the present invention will become apparent.

It has now been discovered in accordance with the present invention that high molecular weight polyesters of carbonic acid can be prepared by reacting cycloaliphatic or aliphatic primary diols containing from 4 to 40 carbon atoms, or polyalkylene primary glycols containing from 2 to 20 alkoxy groups per molecule, each alkoxy group containing 2 to 4 carbon atoms, with chloroformic acid esters of aliphatic univalent alcohols containing from 1 to 4 carbon atoms in a ratio which yields in the resultant intermediate reaction product, 1.0 to 2.0, preferably 1.05 to 1.30 alkylcarbonate ester (R'—O—CO—O—R—) groups per free hydroxyl group. To produce this reaction product, the ratio of reactants which actually react is about 1–1.3 mols of chloroformic acid ester per mol of primary diol.

Whereas an advantage of this invention is that the above reaction can be conducted in the absence of an acid acceptor such as, for example, a tertiary amine, it nevertheless can still be conducted with such an acceptor, with the aforementioned attendant disadvantages, it being preferred, however, that the mol ratio of acceptor to diol be less than about 1.1:1, more preferably less than about 0.1:1, i.e. a catalytic amount.

The intermediate reaction product, after removal of volatile constituents, is then condensed at 70–300° C. in the optional presence of a catalyst to yield the desired polycarbonate resin.

Diols suitable for use in the above reaction include primary aliphatic diols such as butanediol-1,4, hexanediol-1,6, decanediol-1,10, and preferably cycloaliphatic residues containing diols such as dimethylolcyclohexane-1,4, octane-diol-1,8, 2-ethyl-hexane-diol-1,6, hydrogenated dilinoleyl glycol, dimethylol-cyclohexane-1,3, hydrogenated di-oleyl-glycol, and polyalkylene glycols, such as di-, tri-, tetra-, penta-, hexa-, and polyethylene or propylene primary glycols.

In general, the diol must contain at least one primary alcohol group, and it is possible to use primary-secondary diols, such as 1,4-endomethylene -2-hydroxy-5-hydroxymethyl-cyclohexane.

The chloroformic esters used in the process can be produced by reacting alkanols containing 1 to 4 carbon atoms with phosgene at temperatures below 60° C. The reaction mixtures obtained as a result of this reaction can be reacted directly with the diol without further purification.

The reaction of the cycloaliphatic glycols with the chloroformic esters, in accordance with the present invention, can be carried out in a continuous or batchwise manner, and either in the presence or absence of a solvent. The reaction is usually effected at temperatures ranging from 70 or 80 to 150° C., and preferably between 80 and 140° C. in the presence of a current of inert gas to remove the hydrogen chloride as it is formed. It is preferred also to operate under reflux conditions so as to return any unreacated chloroformic ester to the reaction mixture. The glycols can be reacted with the chloroformic alkyl esters in varying amounts determined by the desired ratio of the saponification number to the hydroxyl number. In order to shorten the reaction time, which is of particular importance when the reaction is carried out continuously, an excess of chloroformic acid akyl ester can be used. In such a case, after the desired amount has been reacted, the unreacted chloroformic acid alkyl ester can be removed by distillation under normal or reduced pressure and generally can be used in a subsequent operation without purification. After completion of the reaction it is advisable to remove any remaining volatile compounds, preferably under reduced pressure and in the presence of a current of inert gas.

It is possible to use mixtures of chloroformic acid esters instead of a single particular ester, as for example, the esters obtained by the reaction of one of the diols listed above with an alkanol having 1 to 4 carbon atoms in the molecule in the molar ratio of 1:1.0 to 1:1.8 with phosgene at temperatures between 0 and 60° C., followed by further reaction at 70 to 150° C. The products thus obtained, which contain 1.0 to 2.0, and preferably from 1.05 to 1.30 alkyl carbonate ester groups per hydroxyl group, can be polycondensed at temperatures ranging from 100 to 300° C., preferably 200-300° C., if necessary, in the presence of catalysts, and without further addition of diols. It is thus possible in this manner to produce polycarbonates with different groups in the chain.

The chemical changes and procedures of the process of the present invention (1) are shown in comparison with the best previously known (2) procedures for the production of cycloaliphatic polycarbonates by reaction of glycols with dialkylcarbonates in the following schematic representation:

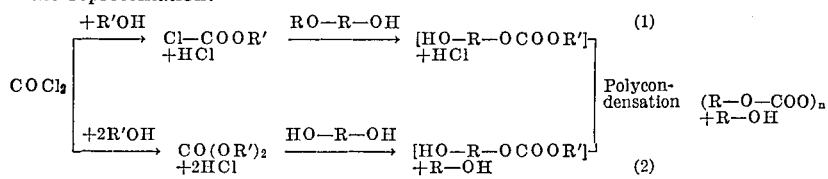

In the above schematic representation R represents an aliphatic or cycloaliphatic group containing 4 to 40 carbon atoms, and preferably a group with a cycloaliphatic ring or an oxaliphatic group and R' is an alkyl group containing 1 to 4 carbon atoms.

From the above equations it will be seen that method (1) of the present invention, with the irreversible liberation of hydrogen chloride, which can be obtained free from water or alcohol, is practically quantitative, and requires only a low temperature and no catalyst. The prior art method (2), on the other hand, requires catalysts for the completion of the reaction and generally also higher temperatures and/or an excess of dialkylcarbonates. When lower alcohols are used, for example, those with 2 carbon atoms, it is generally necessary to separate the alcohols from the resulting distilled dialkyl carbonates.

The prior art method (2) which requires catalysts also generally is subject to the disadvantages of having catalysts in the precondensates which can only be removed with difficulty, or must be neutralized. The fact that the process of the present invention (1) requires no such catalyst represents an important technical advantage over the prior art process.

Phosgene reacts only incompletely at 90 to 120° C. with some glycols as shown in Example I below given for purposes of comparison. It should be noted also that the thermal polycondensation of ethylene-bischloroformic acid esters with glycols at 90 to 130° C. gives relatively low molecular weight polycarbonates since, as shown by Example II below, this reaction also gives chlorine-containing compounds. Due to this fact, it was surprising to find that the glycols named above react with chloroformic acid esters of the lower aliphatic alcohols, generally in about quantitative proportions, and without the formation of chlorine-containing by-products. Nor could it have been predicted that the mixtures produced by this reaction could be polycondensed without the use of catalysts to produce high molecular weight products.

The mixtures produced in accordance with the process of the present invention are suitable for polycondensation if they contain 1.0 to 2.0, and preferably from 1.05 to 1.30, alkyl carbonate ester groups per hydroxyl group. In mixtures obtained from glycols and chloroformic acid alkyl esters, this value is generally given by the quotient:

$$\frac{\text{Saponification number (SN)}}{\text{Hydroxyl number (HN)}}$$

If, as in Example VIII below, this method cannot be used, then other methods of analysis can be used, as for example, hydroxyl- or alkoxy-determination, elementary analysis, spectroscopy, or experimental polycondensation.

Mixtures whose saponification/hydroxyl quotients are less than 1.0 can be brought within the required limits by the addition of glycol-bisalkyl carbonates.

By the addition of chain breaking compounds, such as high boiling alcohols or monocarboxylic acids, the molar weights of the polycarbonates can be regulated or diminished. The polycondensation occurs especially well when the quotient of the saponification/hydroxyl numbers is between 1.05 and 1.30.

The polycondensation can be commenced under normal, reduced, or elevated pressures. Toward the end of the reaction the pressure is generally appreciably reduced. Water vapor and oxygen must generally be excluded from the reaction mixture. It is especially advantageous to use a current of inert gas, such as pure nitrogen, during the polycondensation. For most satisfactory results it is important to keep the reaction mixture well agitated during polycondensation, as for example by passing a current of inert gas through the molten mixture. As previously noted, the reaction can be carried out either batchwise or continuously.

The use of basic catalysts accelerates the reaction, but as pointed out above, the presence of catalysts is disadvantageous in that they must either be removed or neutralized. However, it is often advisable to use small amounts, preferably 0.005 to 0.2% by weight, of basic catalysts such as alcoholates, hydrides or oxides of lithium, sodium, potassium, calcium or magnesium, as well as zinc oxide, titanium alkoxides, or mixtures thereof. Such catalysts can be removed or neutralized by known methods.

The polycondensates produced by the method of the present invention can be used as casting resins for producing fibers, films, coatings or adhesives, according to their consistency and molar weights. In general, they have better mechanical properties than the polycondensates produced by the direct reaction of glycols with phosgene, especially since no chlorine-containing chain breaking by-products are produced in the new process.

The examples given below are for the purpose of illustrating the present invention only and are not to be construed as limiting the invention other than as shown by the appended claims. Variations therefrom will be obvious to one skilled in the art and such variations which do not depart from the concept of the invention are intended to be included in the claims.

EXAMPLE I (for comparison)

A current of 120 parts by weight of phosgene (1.2 mols) was slowly introduced into the bottom of a reaction vessel containing 144 parts by weight of 1,4-dimethylol-cyclohexane (1 mol) having a cis-content of about 25% and a trans-content of about 75%. The mixture was maintained at a temperature of about 90° C.

The temperature of the reaction mixture was then slowly raised to 120° C. After introduction of the phosgene was complete, the reaction mixture was maintained at a temperature of 120-130° C. for approximately 4 hours, while agitating with a current of dry nitrogen gas.

From the reaction product 24 parts by weight of 1,4-dimethylol-cyclohexane were removed by distillation at 95-105° C. under 0.3 mm. pressure. The residue (127 parts by weight) had a hydroxyl number of 152, showing that only 55% of the phosgene had reacted.

EXAMPLE II (for comparison)

269 parts by weight of 1,4-dimethylol-cyclohexane-bischloro-carbonate (1 mol) and 144 parts by weight of 1,4-dimethylol-cyclohexane were melted in a reaction vessel, thoroughly mixed, and then while being agitated by a current of dry nitrogen gas, heated to 120° C. for 4 hours, followed by heating for 3 hours at 130° C. and for 1.5 hours at 150° C. The reaction vessel was then evacuated and heated for an additional period of 2.7 hours at 150° C. under 25 mm. pressure and for an additional 0.3 hour at 170° C. under 20 mm. pressure.

The product of the above reaction, after recovery as described in Example I, was a colorless, brittle, transparent resin, eta red=0.25. No ionic chlorine was detected even after boiling the benzene solution with sodium hydroxide. The usual elementary analysis, however, showed 1.2% chlorine, thus indicating that the resin contained difficultly ionizable chlorine combinations. (The term "eta red" refers to reduced viscosity, measured in a 0.5% solution in phenol - tetrachloroethane 40:60 at 20° C.)

EXAMPLE III 144 parts by weight of 1,4-dimethylol-cyclohexane (1 mol) (25% cis-, 75% trans-) and 142 parts by weight of chloroformic acid ethyl ester (1.31 mols) were heated under a reflux condenser while agitating the mixture with a current of dry nitrogen. With a bath temperature of 130° C., the temperature in the mixture rose from 90° to 120° C. within 20 minutes (corresponding to the conversion of the chloroformic acid ester which boils at 93° C.).

For completion of the reaction, the mixture was kept for 2 hours at 120° C. and then evacuated. After 2 hours at 120° C. under 20 mm. pressure, there remained a residue of 206 parts by weight of a chlorine-free product having a hydroxyl number of 165 (calculated on the basis of 156 for complete conversion).

(a) 20 parts by weight of the raw product were heated in a polymerization tube for 2 hours to a temperature of 200-210° C. (bath temperature). The temperature was then raised to 250° C. during 2 hours. During the entire experiment the mixture was agitated by a current of dry nitrogen. A solid polymer was obtained. After the addition of one drop of titanium tetrabutyl oxide and heating (1 hour at 260° C. and 0.3 hour at 270° C.) under about 1 mm. pressure, 17.5 parts by weight of the 1,4-dimethylol-cyclohexane-polycarbonate were obtained, eta red =0.37.

(b) 20 parts by weight of the raw product and 0.01 part by weight of sodium methylate were heated during 1 hour to 240° C. (bath temperature) under pure nitrogen, and then held for another hour at this temperature. After heating for an additional 0.5 hour at 240° C./15 mm. and 0.5 hour at 250° C./1 mm. followed by an additional 1 hour at 270° C./0.2 mm., the product was found to consist of 17.4 parts by weight polycarbonate as a glasslike hard tough resin. eta red=0.54.

(c) 20 parts by weight of the raw product and 0.02 part by weight of zinc oxide were heated under pure nitrogen during 3.5 hours to 240° C./normal pressure for an additional 0.5 hour at 240° C./15 mm., 0.5 hour at 260° C./1 mm. and 1.0 hour at 270-275° C./0.2 mm. 18.7 parts by weight of the final product were obtained, eta red=0.36.

EXAMPLE IV 288 parts by weight of 1,4-dimethylol-cyclohexane (25% cis-, 75% trans-) (2 mols) and 238.5 parts by weight of chloroformic acid ethyl-ester (2.19 mols) were agitated by a weak current of dry nitrogen under a reflux condenser for 2 hours at 90° C., 2 hours at 110–120° C. under normal pressure and 2 hours at 120° C. under 20 mm. pressure. The yield of final product was 392 parts by weight of a mixture with saponification number of 245.5, and OH-number of 244.0, and their quotient 1.005.

(a) 20 parts by weight of the reaction product were heated in a weak current of nitrogen during 2 hours at 200-220° C., 1 hour from 220 to 240° C. and 1 hour to 270° C. (bath temperature). A vacuum was then applied with an oil pump and the heating continued for 2 hours at 270° C., and for 0.75 hour at 280° C. (bath temperatures). The product was a hard, tough, transparent and colorless resin, eta red=0.44.

(b) 20 parts by weight of the reaction product and 0.01 part by weight of sodium methylate were heated as in (a) for 2 hours at 220-240° C., for 0.5 hour at 240-265° C. (bath temperature) under normal pressure and for 1 hour at 265° C. under an oil-pump vacuum. The resulting resin had an eta red=0.51.

EXAMPLE V 288 parts by weight of 1,4-dimethylol-cyclohexane (75% trans-) (2 mols) and 238.8 parts by weight of chloroformic acid ethylester (2.2 mols) were reacted as described in Example III. The yield was 388 parts by weight of a product with a saponification number of 253 and a hydroxyl number of 215, their quotient being 1.18.

(a) 188 parts by weight of this product without catalyst were heated under pure nitrogen at normal pressure for 2 hours for from 200 to 220° C. (bath temperature), and then the bath temperature was raised from 220 to 270° C. during 1 hour and from 270 to 275° C. during an additional 0.25 hour. The yield was 180 parts by weight of precondensate.

(b) 20 parts by weight of the product from (a) were heated without catalyst and with agitation by a current of pure nitrogen for 0.5 hour at 280° C. (bath temperature), for an additional 0.5 hour at 280 to 290° C., and for an additional 0.25 hour from 290 to 300° C. The volatile components were then driven off at 280 to 290° C. under 1 mm. pressure. The residue was a transparent, colorless, hard and tough resin with eta red=0.46.

(c) 75.3 parts by weight of the product from (a) were reacted with 0.02 part by weight of sodium methylate and while being agitated by a current of pure nitrogen heated for 1 hour from 230 to 250° C. (inside temperature) under 1.5 to 1 mm. pressure, for an additional 0.3 hour at 250-258° C. and for another 1 hour at 250° C. under 1 mm. The product consisted of 57.7 parts by weight of a colorless transparent resin (as under (b)), eta red=0.65. It was also possible to obtain:

(1) 7.7 parts by weight of a distillate consisting mainly of ethanol, and (2) 7.25 parts by weight of a distillate boiling at above 100° C. under 12 mm. pressure and consisting of 1,4-dimethylol-cyclohexane, or its carbethoxylation products.

EXAMPLE VI 60 parts by weight of hexanediol-1,6 (0.51 mol) and 57.9 parts by weight of chloroformic acid ethylester (0.53 mol) were heated during 3 hours from 90 to 120° C. (inside temperature) and then kept for 1 hour at 120° C. under 20 mm. pressure. The product had an acid number of 0.2 and a saponification number of 302 and a hydroxyl number of 245, their quotient being 1.23.

The polycondensation obtained as described in Example 5(c) consisted of a waxlike mass, eta red=0.44, M.P. 62° C.

EXAMPLE VII 600 parts by weight of the diol $C_{36}H_{68}O_2$, being hydrogenated dilinoleyl glycol, produced by the method of Corvan and Wheeler, J. Am. Soc. 66 (1944), 84 (note 14A), 86 (1.13 mol) and 180 parts by weight of chloroformic acid ethyl-ester (1.66 mol) were heated with stirring for 3 hours at a bath temperature of 120–130° C., while a weak current of dry nitrogen was passed through the mixture. After heating for 2 hours at 120°

C. under 20 mm. pressure, the excess of chloroformic acid ester and the remaining hydrogen chloride were driven off. The yield consisted of 665 parts by weight of a product having a saponification number of 93.5 and a hydroxyl number of 85, their quotient being 1.10.

(a) By polycondensations as described in Example III (a to c), transparent, rubberlike, elastic and difficultly soluble resins were obtained.

(b) 160 parts by weight of the product of Example III (hydroxyl number 165) and 40 parts by weight of the product of Example VII were mixed with 0.15 part by weight of a 13% solution of NaHTi $(OC_4H_9)_6$ in n-butanol (produced according to Laakso and Reynolds, J. Am. Soc. 82, 3641 (1960)), while being agitated by a current of pure nitrogen for 1 hour at 200 to 220° C. (bath temperature), and then heating for an additional 1 hour from 220 to 270° C., with an additional hour of heating at 270° C., but under 1.2 mm. pressure, and finally for an additional 0.3 hour at between 270 and 280° C. while under 1.2 mm. pressure. The yield was 168 parts by weight of a colorless tough resin, eta red=0.68.

EXAMPLE VIII 288 parts by weight of 1,4-dimethylol-cyclohexane (73% trans-) (2 mols) and 109 parts by weight of ethanol (96%) (2.3 mols) were heated to complete solution, then cooled to 10° C., and then 260 parts by weight of phosgene (2.3 mols) introduced while the temperature was kept between 10 and 30° C. The mixture was stirred for 12 hours at room temperature and then for 4 hours at 50° C. and finally for 3 hours at 120° C. while a current of dry air was passed through the mixture to carry away the liberated hydrogen chloride.

The remaining volatile constituents were then removed by heating for 2 hours at 120° C. under 20 mm. pressure by an air current. The yield was 380 parts by weight of raw product having a hydroxyl number of 152 and a saponification number of 324, acid number 0.005 and Cl-content<0.5%.

According to analyses the reaction mixture had a composition corresponding to the formula:

$$HO-CH_2-\langle H \rangle-CH_2-O-CO-O-CH_2$$
$$-\langle H \rangle-CH_2-O-COOC_2H_5$$
(A)

Calculated from Formula A, the hydroxyl number was 145, the saponification number was 290 and the acid number was 0. The yield, on the basis of (A), was 98% of the theoretical.

The compound (A) furnished the following data:

Cl content—less than 0.5%
Molecular weight—358 (calculated 386.5) (cryoscopic, in dioxane)
*Elementary analysis.*—Calculated for $C_{20}H_{34}O_7$ (386.5), percent: C, 62.15; H, 8.87; O, 28.98. Determined, percent: C, 62.14; H, 9.02; O, 28.79.

The reaction mixture was polycondensable according to Examples 3 (a to c) and 5 (b and c) into a hard colorless resin.

EXAMPLE IX

Into a mixture of 288 parts by weight of 1,4-dimethylol-cyclohexane (73% trans-) (2 mols) and 72 parts by weight of methanol (2.25 mols), 260 parts by weight of phosgene were introduced at 5–10° C. as described in Example VIII. A water-cooled reflux condenser was then set up and the mixture agitated in a weak current of dry air while being warmed during 2 hours from 20 to 25° C.

and additionally for 1 hour at 50° C., 1 hour at 65° C., 1 hour at 80° C., and 2 hours at from 100 to 110° C.

After cooling to 70° C., 16 parts by weight of methanol (0.5 mol) were added and then, without refluxing, the mixture was kept for 2 hours under normal pressure, and for another 2 hours under the vacuum of a water jet aspirator at 120° C.

There remained a residue of 361.5 parts by weight (=97% theoretical) of the following composition:

$$HO-CH_2-\langle H \rangle-CH_2-O-CO-O-CH_2$$
$$-\langle H \rangle-CH_2-O-CO-OCH_3$$

*Elementary analysis.*—Calculated for $C_{19}H_{32}O_7$ (372.5), percent: C, 61.26; H, 8.66; O, 30.07. Determined, percent: C, 61.19; H, 8.47; O, 29.95.

30 parts by weight of this product were polycondensed by each of the following three methods:

(a) without catalyst
(b) with 0.015 part by weight of sodium methylate catalyst
(c) with 0.022 part by weight of sodium methylate catalyst wherein the bath temperature during 2 hours was raised from 200° to 225° C., and during another hour from 225° to 250° C. under normal pressure. Under the vacuum of an oil pump the mixture was then heated during 1 hour from 230° to 240° C., during 1 hour from 240° to 250° C., and during 0.5 hour from 250° to 255° C. The yields of resinous products were from 24 to 27 parts by weight of product. The eta red values were from (a) 0.36, (b) 0.62, (c) 0.81.

EXAMPLE X (Comparison) This example shows that secondary diols do not work in the absence of acid-acceptors. Specifically, Example 1, Method 2 of British Patent 925,139 is repeated as follows with the exclusion of pyridine:

72 parts (0.5 mol) of 2,2,4,4-tetramethylcyclobutane-diol-1,3 are mixed with 130 parts (1.19 mol) of chloroformic acid ethyl ester and slowly heated to 90° C. with stirring and under a nitrogen atmosphere, and then heated within 20 minutes from 90° C. to 120° C. The mixture is thereafter treated for another two hours at 120° C. The chloroformic acid ethyl ester can then be distilled off again. The residue recovered is 64.5 g. 2,2,4,4-tetramethylcyclobutanediol-1,3, having the melting point of 122° C./124–128° C. (mixed melting point with tetramethylcyclobutanediol-1,3: 120° C./123°–125° C.).

This conclusively proves that no reaction takes place, and that for the production of polycarbonates without the use of pyridine, it is necessary to employ primary diols instead of the substituted cycloalkyl secondary diols of the British reference.

EXAMPLE XI

Example X is repeated except the mol ratio of chloroformic acid to diol was lowered to that employed in Example III. The results, however, are substantially the same as in Example X, there being no discernible reaction of tetramethylcyclobutanediol-1,3.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of high molecular weight polyesters of carbonic acid which comprises reacting in the absence of an acid-acceptor at temperatures between 70 and 300° C., a compound selected from the group consisting of butane-diol-(1,4), hexanediol-(1,6), decanediol-(1,10), dimethylolcyclohexane-1,4, and hydrogenated dilinoleyl glycol, with at least one chloroformic acid ester of an aliphatic univalent alcohol containing from 1 to 4 carbon atoms, the ratio of reactants being such that the reaction product contans 1.0 to 2.0 alkyl carbonate ester groups per free hydroxyl group and polycondensing the reaction product at temperatures ranging from 200 to 300° C.

2. A process as defined by claim 1, wherein said compound is dimethylolcyclohexane-1,4.

3. A process as defined by claim 1, wherein said compound is butane-diol-1,4.

4. A process as defined by claim 1, wherein said compound is hexane-diol-1,6.

5. A process as defined by claim 1, wherein said compound is decane-diol-1,10.

6. A process as defined by claim 1, wherein said polycondensing is conducted in the absence of any prior steps for purifying said reaction product.

References Cited

UNITED STATES PATENTS

| 2,210,817 | 8/1940 | Peterson | 260—77.5 |
| 2,901,466 | 8/1959 | Kibler et al. | 260—77.5 |
| 3,359,242 | 12/1967 | Seeliger | 260—77.5 |

FOREIGN PATENTS

| 138,030 | 1/1960 | U.S.S.R. |
| 925,139 | 5/1963 | Great Britain. |

SAMUEL H. BLECH, Primary Examiner

U.S. Cl. X.R.

260—463

UNITED STATES PATENT OFFICE
CERTIFICATE OF CORRECTION

Patent No. 3,506,623      Dated April 14, 1970

Inventor(s) WOLFGANG SEELIGER

It is certified that error appears in the above-identified patent and that said Letters Patent are hereby corrected as shown below:

Column 3, Line 21, change "RO- R - OH" to ---HO- R - OH---

SIGNED AND
SEALED
OCT 13 1970

(SEAL)
Attest:

Edward M. Fletcher, Jr.
Attesting Officer

WILLIAM E. SCHUYLER, JR.
Commissioner of Patents